July 1, 1924.
S. DYHR
ELECTRIC WELDING
Filed Aug. 26, 1921
1,499,645
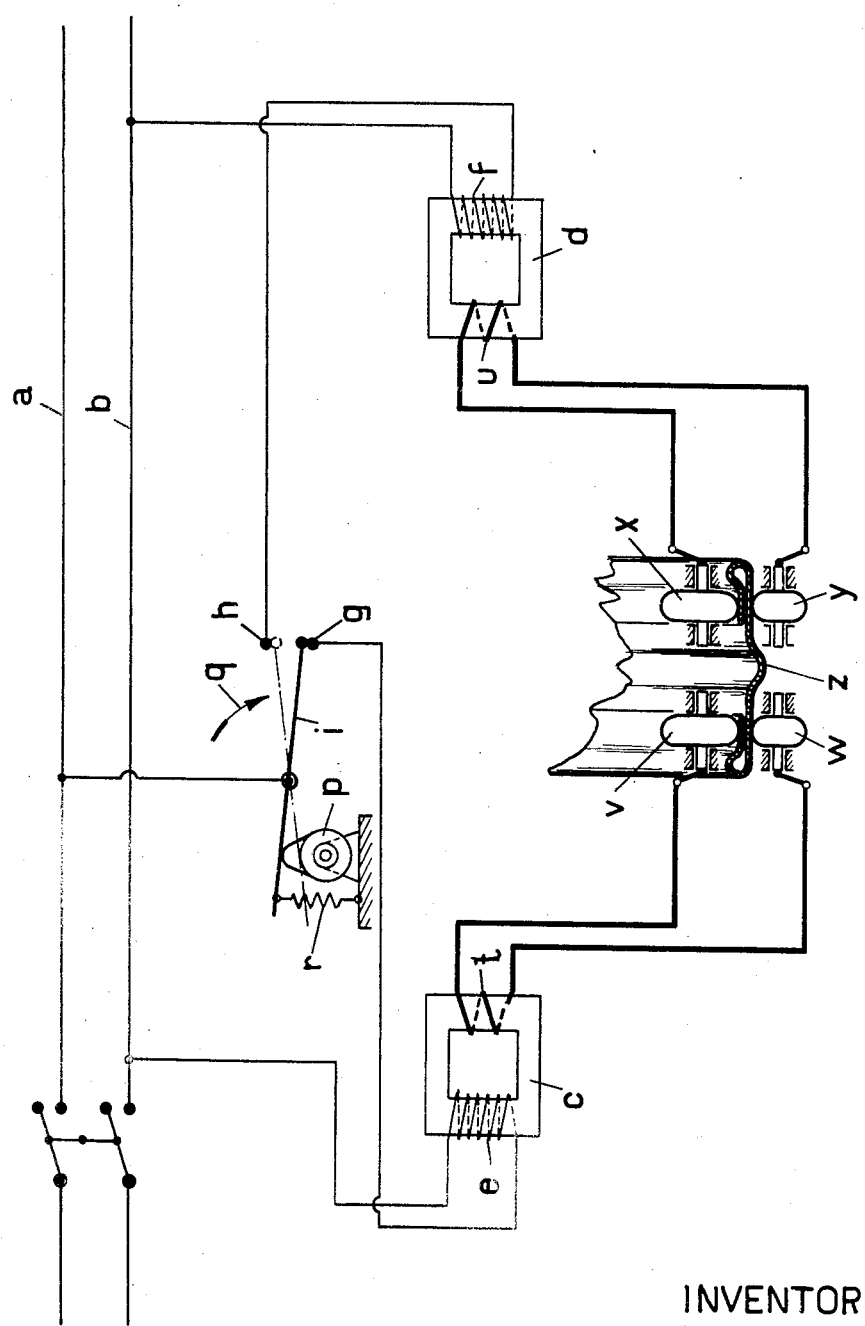
INVENTOR:

Patented July 1, 1924.

1,499,645

UNITED STATES PATENT OFFICE.

SVEND DYHR, OF BERLIN-CHARLOTTENBURG, ASSIGNOR TO DEUTSCHE SCHWEISS-MASCHINEN-FABRIK, BECKER & CO., A. G., OF BERLIN-SCHONEBERG, GERMANY.

ELECTRIC WELDING.

Application filed August 26, 1921. Serial No. 495,772.

*To all whom it may concern:*

Be it known that I, SVEND DYHR, a citizen of Denmark, residing at No. 72/73 Knesebeckstrasse, Berlin-Charlottenburg, Germany, have invented certain new and useful Improvements in Electric Welding According to the Resistance Principle, of which the following is a specification.

My invention relates in general to an electric welding process operating in accordance with the resistance principle and more particularly to a process of this kind which is adapted for welding a plurality of seams in one and the same piece of work. Such an electric resistance method of welding may be employed in welding the two parallel seams that occur in the trunks or bodies of many types of boxes, cans, etc., for meat, jam, preserves and the like, or it may be used for welding the circular, parallel seams of the two thickened, lateral tubular edges with which the fellies of some types of wheels are provided. The seams are welded point by point, the welded points or "spot welds" being more or less distant from each other so that a fully closed or partly closed seam results. In producing two welded seams at the same time two pairs of metal-fusing or welding electrodes must be provided, and hitherto it has been the general practice to supply the current to the two pairs of electrodes from one and the same low-tension transformer. The welding electrodes used are preferably of the roller type and the current is sent through them in the form of current impulses so that two seams are produced each of which consists of a series of spot welds.

As already stated the pairs of electrodes in known machines received current impulses from a common low-tension transformer (from the secondary coil of the same). The result of this was that the two pairs of electrodes always produced two spot welds simultaneously so that at each moment of welding the transformer had to yield double the output required for one weld and the strength of the current taken from the electric power mains was twice that needed for a single weld.

The object of my invention is to remove this drawback and I accomplish this by causing the spot welds of one seam to be produced in the intervals in which the spot welds in the other seam are produced. Thus the production of a spot weld in one seam is always followed by the production of a spot weld in the other seam. By this means heavy current impulses are avoided and the current taken from the electric power supply is continuous or almost continuous and its amperage is reduced to one half of that required for the simultaneous production of two welds. Another feature of my invention consists of a process for producing double seams by two pairs of electrodes each connected to a separate low-tension transformer.

In accordance with the invention current impulses are sent into the primary coils of the transformers alternately, as by a two-way switch, so that they do not take current simultaneously.

When an arrangement of this kind is used for welding two parallel seams each comprising a series of spot welds in a single piece of work, say a jam tin, the individual spot welds of the one seam will be displaced with respect to those in the second seam in such a way that the welds of the one seam are opposite to coincide with, the unwelded intervals of the other seam. Motion may be imparted during welding either to the work or to the electrodes. The number of transformers and pairs of electrodes used may be two or more so that two or more seams may be welded at the same time.

An example of an arrangement that may be used for carrying out the process in accordance with the invention is diagrammatically shown in the drawing. $a$ and $b$ are the alternating current mains from which the current is taken. $c$, $d$ represent two transformers whose primary coils $e$, $f$ receive current from the mains $a$, $b$. One primary terminal of each transformer is connected to a contact $g$, $h$ of a two-way switch whose circuit-closer $i$ is oscillated by means of a cam $p$ and a spring $r$ so that current impulses are alternately sent through the primary coils $e$ and $f$ of the transformers $c$ and $d$ when the main switch $s$ is closed.

The secondary coils $t$ and $u$ are connected to the two pairs of roller electrodes $v$, $w$ and $x$, $y$ by means of which the spot welds of the seams of the felly $z$ are produced. Current impulses are thus alternately sent through the pairs of electrodes $w$, $r$ and $x$, $y$ in accordance with the circuit closures of the lever $i$ at the contacts $g$ and $h$. When the work $z$ is moved through the bites of the roller electrodes spot welds are produced at the lateral, thickened, circular edges of the felly, the spot welds in the two seams being displaced with respect to each other so that the current impulses flowing through the transformers are never taken from the electric supply source at identical moments.

It is important that the welds in the two seams of such a felly with thickened, lateral, circular edges be produced collaterally or in a single operation in order to preclude warping of the felly.

I claim:—

1. In a process of welding by alternating electric currents in accordance with the resistance principle, producing a plurality of series of spot welds in one and the same piece of work by pairs of electrodes each of which takes current from a separate low-tension transformer, the primary coils of the low-tension transformers being supplied with current at alternate intervals, whereby the period of welding at one pair of electrodes is made to correspond with the non-welding period of another pair of electrodes and the individual welds are separated in time and space.

2. A process of welding fellies with a plurality of seams, consisting in producing a series of welds in each seam by trains of welding impulses which operate alternately at a different seam.

In testimony whereof I have signed this specification in the presence of two witnesses.

SVEND DYHR.

Witnesses:
 WILHELM TAHOFF,
 PAUL FARS.